(12) United States Patent
Kim et al.

(10) Patent No.: US 8,785,069 B2
(45) Date of Patent: Jul. 22, 2014

(54) FUEL CELL SYSTEM HAVING A REFORMER

(75) Inventors: Hyun Kim, Yongin-si (KR); Dong-Rak Kim, Yongin-si (KR); Dong-Hyun Kim, Yongin-si (KR); Ming-Zi Hong, Yongin-si (KR); Woong-Ho Cho, Yongin-si (KR)

(73) Assignee: Samsung SDI Co., Ltd (KR)

( * ) Notice: Subject to any disclaimer, the term of this patent is extended or adjusted under 35 U.S.C. 154(b) by 475 days.

(21) Appl. No.: 12/971,437

(22) Filed: Dec. 17, 2010

(65) Prior Publication Data

US 2011/0262820 A1    Oct. 27, 2011

Related U.S. Application Data

(60) Provisional application No. 61/327,596, filed on Apr. 23, 2010.

(51) Int. Cl.
*H01M 8/06* (2006.01)

(52) U.S. Cl.
USPC ........... 429/436; 429/423; 429/433; 429/434; 429/435

(58) Field of Classification Search
USPC ................. 429/423, 425, 433–436; 48/198.1, 48/198.3
See application file for complete search history.

(56) References Cited

U.S. PATENT DOCUMENTS

| 6,641,625 | B1 | 11/2003 | Clawson et al. | |
|---|---|---|---|---|
| 2003/0031900 | A1 | 2/2003 | Tajima et al. | |
| 2003/0154654 | A1 | 8/2003 | Goebel | |
| 2004/0055866 | A1* | 3/2004 | Levine | 202/205 |
| 2005/0175870 | A1 | 8/2005 | Hagan et al. | |
| 2007/0033873 | A1* | 2/2007 | D'Souza | 48/198.7 |
| 2008/0311446 | A1* | 12/2008 | Lee et al. | 429/19 |

FOREIGN PATENT DOCUMENTS

| CN | 1658421 A | 8/2005 |
|---|---|---|
| JP | 2002-42847 A | 2/2002 |
| JP | 2004-152526 A | 5/2004 |

(Continued)

OTHER PUBLICATIONS

Japanese Office Action issued Dec. 19, 2012 in related application No. JP 2011-078968.
Communication pursuant to Article 94(3) EPC in EP 11 160 605.9-1227.
Extended European Search Report in related European Application EP 11160605.9 dated Jul. 9, 2011.

(Continued)

*Primary Examiner* — Jonathan G Leong
*Assistant Examiner* — James Erwin
(74) *Attorney, Agent, or Firm* — Knobbe, Martens, Olson & Bear LLP

(57) ABSTRACT

A fuel cell system includes a fuel cell stack, an oxidizer supply unit, a reformer, a fuel tank, and a water tank. The reformer generates a hydrogen-containing reformed gas reformed from hydrocarbon-based fuel and supplies it to the fuel cell stack. The fuel tank supplies the hydrocarbon-based fuel to the reformer. The water tank supplies water to the reformer. The reformer includes a reforming unit configured to have a reforming reaction generated therein, a combustion unit configured to supply heat energy to the reforming unit, and a carbon monoxide reduction unit configured to reduce the concentration of carbon monoxide in a reformed gas discharged from the reforming unit. A combustion gas pipe is connected to the combustion unit. A reformed gas pipe is disposed between the reforming unit and the carbon monoxide reduction unit. At least one of the combustion gas pipe and the reformed gas pipe is configured to pass through the inside of the water tank or to raise a temperature of the water tank through contact with the water tank, thereby preventing the freezing of the water tank.

20 Claims, 9 Drawing Sheets

(56) References Cited

FOREIGN PATENT DOCUMENTS

| | | |
|---|---|---|
| JP | 2005-050563 A | 2/2005 |
| JP | 2006-80093 A | 3/2006 |
| JP | 2006-252780 A | 9/2006 |
| KR | 10-2007-0054498 A | 5/2007 |
| WO | WO 2009/109744 A2 | 9/2009 |

OTHER PUBLICATIONS

KIPO Office Action issued Aug. 27, 2013 in related application No. KR 10-2011-0023502.

SIPO Office Action issued Jun. 5, 203 in related application No. CN 201110087173.8, with English translation.

SIPO Office Action (China) issued Nov. 7, 2013 in application No. CN-201110087173.8, which corresponds to the present application.

\* cited by examiner

FUEL CELL SYSTEM HAVING A REFORMER

BACKGROUND OF THE INVENTION (a) Field of the Invention

The present invention relates to a fuel cell system. More particularly, the present invention relates to a reformer for receiving fuel and water and generating reformed gas and a water tank for supplying water to the reformer.

(b) Description of the Related Art

A fuel cell system basically includes a fuel cell stack, a fuel supply unit, and an oxidizer supply unit. The fuel cell stack receives fuel (hydrocarbon-based fuel, pure hydrogen, or hydrogen-rich reformed gas) and an oxidizer (air or pure air) from the fuel supply unit and the oxidizer supply unit, respectively, and generates electrical energy using an electrochemical reaction of the fuel and the oxidizer.

For example, in a polymer electrolyte fuel cell, a fuel cell system further includes a reformer for generating hydrogen-rich reformed gas by reforming hydrocarbon-based fuel. The polymer electrolyte fuel cell is complicated because it has to further include the reformer and its incidental units, but is suitable for a stationary installation type, such as for home use, because it has a high energy density and a high output.

The types of the reformer include a steam reformer, a partial oxidization reformer, and an autothermal reaction reformer. From among them, the steam reformer has a high hydrogen concentration of reformed gas and an excellent long-time operation stability. The steam reformer includes a reforming unit in which a chemical catalyst reaction resulting from heat energy of hydrocarbon-based fuel and steam is performed and a combustion unit (burner) in which the reforming unit is heated at a temperature of 750° C. or more in order to accelerate the chemical catalyst reaction of the reforming unit.

The reforming unit is connected to a fuel tank and is supplied with hydrocarbon-based fuel stored in the fuel tank when a fuel pump is operated. Further, the reforming unit is connected to a water tank and is supplied with water stored in the water tank when a water pump is operated. The combustion unit receives external air and the hydrocarbon-based fuel stored in the fuel pump and generates heat energy by combusting the fuel and the air.

In the above-described fuel cell system, when outside temperature goes down below zero, the water of the water tank is changed to ice. In this case, the fuel cell system cannot be used. To reuse the fuel cell system, you have to wait until the ice melts at above-zero temperature or to take a measure to melt the ice by, for example, installing hot wires in the water tank. However, a lot of time is taken to melt the ice at above-zero temperature. Further, in the case in which the hot wires are installed in the water tank, generating efficiency of the fuel cell system is lowered because additional power for driving the hot wires is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a fuel cell system having an advantage of stably operating the fuel cell system even at a sub-zero temperature by preventing the freezing of a water tank without lowering generating efficiency.

An exemplary embodiment of the present invention provides a fuel cell system, comprising a fuel cell stack, an oxidizer supply unit, a reformer, a fuel tank, and a water tank. The fuel cell stack generates electrical energy by an electrochemical reaction of hydrogen and oxygen. The oxidizer supply unit supplies an oxygen-containing oxidizer to the fuel cell stack. The reformer generates hydrogen-containing reformed gas reformed from hydrocarbon-based fuel and supplies it to the fuel cell stack. The fuel tank supplies the hydrocarbon-based fuel to the reformer, and the water tank supplies water to the reformer.

The reformer includes a reforming unit configured to have a reforming reaction generated therein, a combustion unit configured to supply heat energy to the reforming unit, and a carbon monoxide reduction unit configured to reduce the concentration of carbon monoxide in reformed gases discharged from the reforming unit. A combustion gas pipe is connected to the combustion unit. A reformed gas pipe is provided between the reforming unit and the carbon monoxide reduction unit. At least one of the combustion gas pipe and the reformed gas pipe passes through the inside of the water tank or raises a temperature of the water tank through contact with the water tank, thus preventing the freezing of the water tank.

DETAILED DESCRIPTION OF THE EMBODIMENTS

The present invention will be described more fully hereinafter with reference to the accompanying drawings, in which some exemplary embodiments of the invention are shown. As those skilled in the art would realize, the described embodiments may be modified in various different ways, all without departing from the spirit or scope of the present invention.

Figure 1:
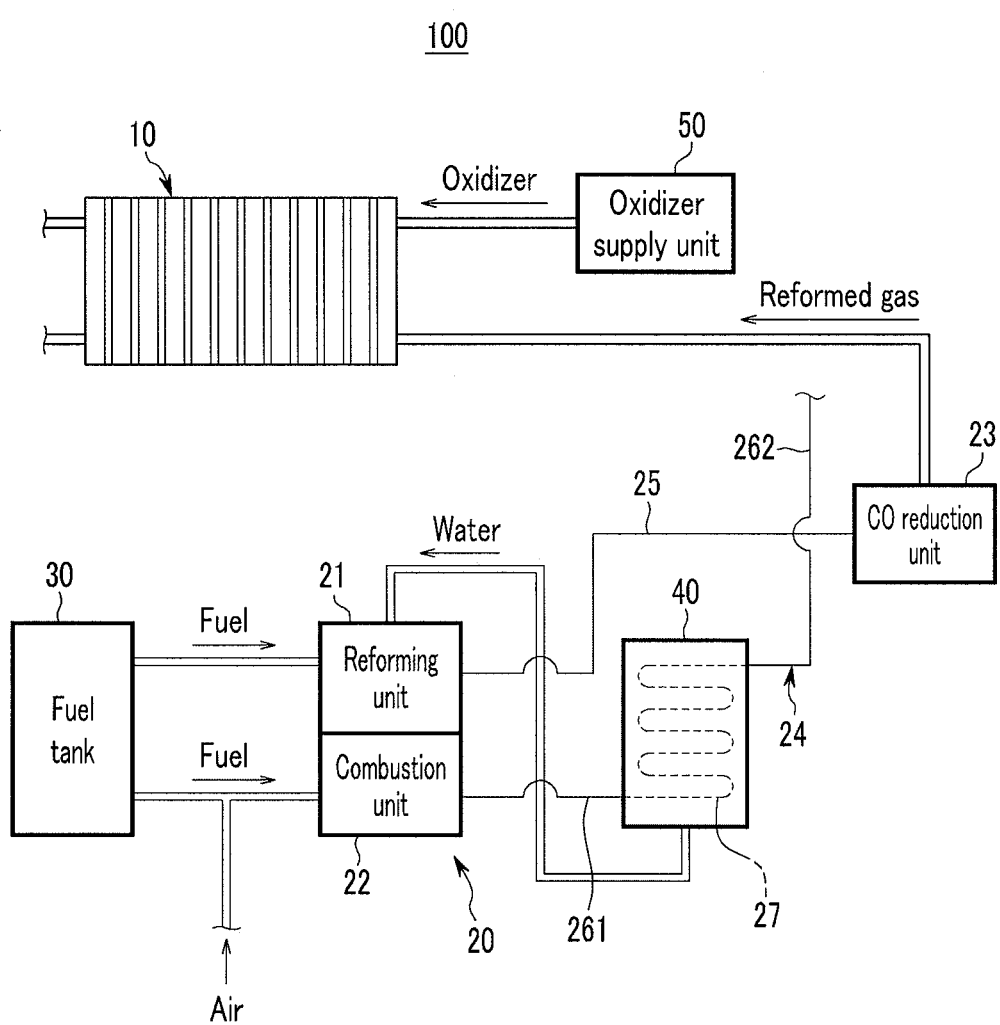
FIG. 1 is a schematic diagram of a fuel cell system according to a first exemplary embodiment of the present invention.
Figure 2:
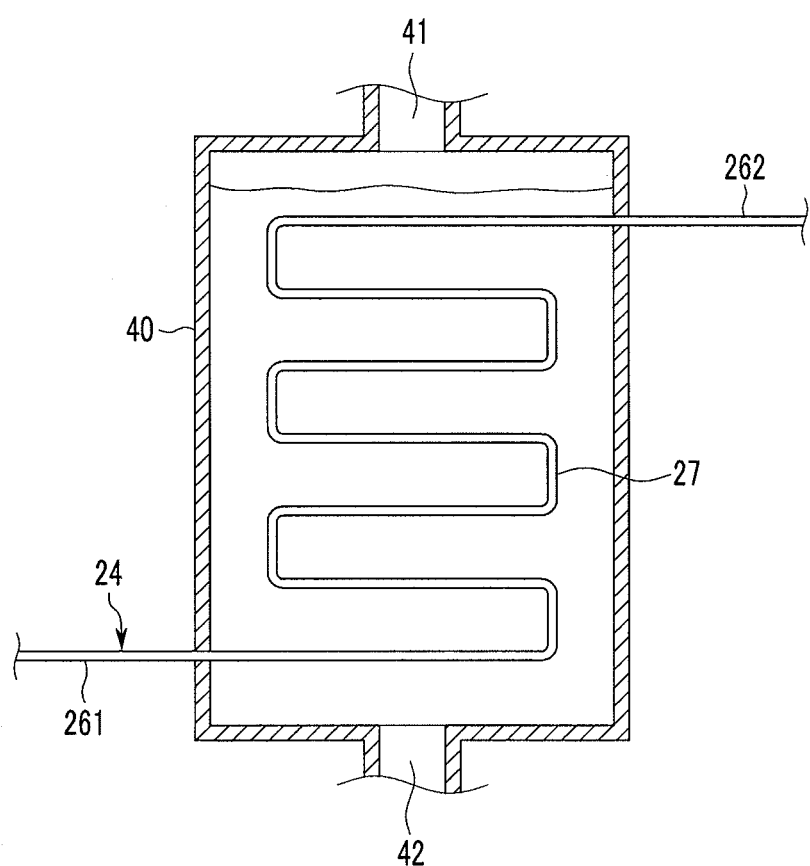
FIG. 2 is a cross-sectional view of the water tank of the fuel cell system shown in FIG. 1.

FIG. 1 is a schematic diagram of a fuel cell system according to a first exemplary embodiment of the present invention, and FIG. 2 is a cross-sectional view of the water tank of the fuel cell system shown in FIG. 1.

Referring to FIGS. 1 and 2, the fuel cell system 100 according to the first exemplary embodiment includes a fuel cell stack 10, a reformer 20, a fuel tank 30, a water tank 40, and an oxidizer supply unit 50. The reformer 20 and the fuel tank 30 and the water tank 40 constitute the fuel supply unit of the fuel cell system 100. The fuel cell system 100 is a Polymer Electrolyte Membrane Fuel Cell (PEMFC) for generating electrical energy using hydrogen-rich reformed gas.

The fuel cell stack 10 generates electrical energy by an electrochemical reaction of external reformed gas and an external oxidizer (air or pure air). The fuel cell stack 10 has a structure in which a plurality of unit cells is stacked. Each of the unit cells includes a Membrane-Electrode Assembly (MEA) and a pair of separators disposed on both sides thereof.

The MEA includes an electrode membrane, the anode disposed on one side of the electrode membrane, and the cathode disposed on the other side of the electrode membrane. The pair of separators includes an anode separator configured to face the anode and to supply the reformed gas to the anode and a cathode separator configured to face the cathode and to supply the oxidizer to the cathode.

The anode functions to separate hydrogen, contained in the fuel, into electrons and protons by an oxidation reaction. The cathode functions to separate oxygen, contained in the oxidizer, into electrons and oxygen ions by a reduction reaction. The electrode membrane has an ion exchange function of moving the protons of the anode to the cathode. The MEA generates electrical energy by the electrochemical reaction of hydrogen and oxygen and generates water as by-products of the electricity generation reaction.

The oxidizer supply unit 50 supplies the oxidizer to the fuel cell stack 10. The oxidizer can be external air or oxygen stored in an oxygen tank (not shown). The oxidizer supply unit 50 can include an air compressor (not shown) for supplying air, containing oxygen, to the fuel cell stack 10.

The reformer 20 generates hydrogen-rich reformed gas by reforming the hydrocarbon-based fuel and supplies the hydrogen-rich reformed gas to the fuel cell stack 10. The reformer 20 is a steam reformer and configured to generate reformed gas using hydrogen as a chief ingredient by a chemical reaction (i.e., a chemical catalyst reaction by heat energy) of the hydrocarbon-based fuel and steam. In a steam reforming method, a large amount of heat energy has to be supplied externally, but the supply of reformed gas is stable and hydrogen gas of a high concentration can be generated.

The reformer 20 includes a reforming unit 21, a combustion unit (burner) 22, a carbon monoxide (CO) reduction unit 23, a combustion gas pipe 24, and a reformed gas pipe 25.

The reforming unit 21 is connected to the fuel tank 30 and the water tank 40 and configured to receive the hydrocarbon-based fuel and water, respectively, from the fuel tank 30 and the water tank 40. The reforming unit 21 generates reformed gas by a chemical catalyst reaction, caused by heat energy, from the hydrocarbon-based fuel and the water supplied thereto.

The combustion unit 22 supplies the heat energy to the reforming unit 21, thereby raising a temperature of the reforming unit 21 to 750° C. or more. To this end, the combustion unit 22 is connected to the fuel tank 30 and configured to receive the hydrocarbon-based fuel from the fuel tank 30 and air from an air pump (not shown) and to generate the heat energy by combusting the hydrocarbon-based fuel and the air supplied thereto. The combustion gas pipe 24 is connected to the combustion unit 22 and configured to discharge externally combust gases generated when the combustion unit 22 is operated.

The chemical catalyst reaction generated in the reforming unit 21 is an endothermic reaction. Accordingly, the combustion unit 22 supplies the heat energy to the reforming unit 21 so that the chemical catalyst reaction can be smoothly performed. As described above, some of the hydrocarbon-based fuel stored in the fuel tank 30 is supplied to the reforming unit 21 and used to generate the reformed gas. The remainder of the hydrocarbon-based fuel is supplied to the combustion unit 22 and used to generate the heat energy for the chemical catalyst reaction of the reforming unit 21.

The fuel tank 30 stores the hydrocarbon-based fuel of a liquid or gas state, such as methanol, ethanol, liquefied natural gas, liquefied petroleum gas, gasoline, or butane gas. The hydrocarbon-based fuel stored in the fuel tank 30 is supplied to the reforming unit 21 and the combustion unit 22 by a fuel pump (not shown). Various kinds of pumps, such as a pneumatic pump, a diaphragm pump, and a motor pump, can be used as the fuel pump.

The water tank 40 stores the water supplied to the reforming unit 21. A water inlet 41 for supplying external water can be formed on the top of the water tank 40. A water outlet 42 for supplying water stored therein to the reforming unit 21 can be formed at the bottom of the water tank 40. The water stored in the water tank 40 is supplied to the reforming unit 21 by a water pump (not shown). Various kinds of pumps, such as a pneumatic pump, a diaphragm pump, and a motor pump, can be used as the water pump.

A primary reformed gas discharged from the reforming unit 21 includes hydrogen gas (i.e., a chief ingredient) and a small amount of carbon monoxide, carbon dioxide, and methane gas. A melt carbonate fuel cell and a solid oxide fuel cell (i.e., fuel cells for high temperature) can use both hydrogen and carbon monoxide as fuel. However, in the polymer electrolyte fuel cell, carbon monoxide poisons a platinum catalyst used as the anode and the cathode of the MEA is poisoned, thus deteriorating the performance of the fuel cell stack 10. Accordingly, the concentration of carbon monoxide in the reformed gas has to be lower 10 ppm or less.

The carbon monoxide reduction unit 23 is connected to the reforming unit 21 through the reformed gas pipe 25 and supplied with the primary reformed gas, including carbon monoxide, from the reforming unit 21. The carbon monoxide reduction unit 23 can include a water gas shift converter and a carbon monoxide purifier.

The water gas shift converter lowers the concentration of carbon monoxide to 0.5% to 1% through a water gas shift in which carbon monoxide reacts to steam to further generate hydrogen. The water gas shift can be classified into a high temperature water gas shift in which the concentration of carbon monoxide is lowered to about 4% in temperature conditions of approximately 400° C. and a low temperature water gas shift in which the concentration of carbon monoxide is lowered to 0.5% to 1% in temperature conditions of approximately 200° C. The steam left after being used in the reforming unit 21 is supplied to the water gas shift converter, and so steam necessary for the water gas shift can be supplied.

The carbon monoxide purifier can include a selective oxidation reaction unit or a methanation reaction unit. The selective oxidation reaction unit receives a small amount of air and selectively oxidizes and removes only the carbon monoxide. The methanation reaction unit converts carbon monoxide and hydrogen into methane again through a reaction of the carbon monoxide and the hydrogen. The carbon monoxide reduction unit reduces carbon monoxide, included in the primary reformed gas, to 10 ppm or less and supplies a secondary reformed gas having reduced carbon monoxide to the fuel cell stack 10.

The temperature of the combustion gas pipe 24 can be approximately 80° C. to 90° C. In the fuel cell system 100 of the present exemplary embodiment, the water tank 40 prevents the freezing of water by raising internal temperature using the heat of the combustion gas pipe 24. To this end, the combustion gas pipe 24 is configured to pass through the inside of the water tank 40. That is, the combustion gas pipe 24 includes a first exhaust unit 261 disposed between the combustion unit 22 and the water tank 40, a heat exchange unit 27 disposed within the water tank 40, and a second exhaust unit 262 disposed outside of the water tank 40.

Part of or the entire heat exchange unit 27 can be bent. The heat exchange unit 27 can be spaced apart from the interior wall of the water tank 40 with a predetermined distance therebetween except portions in which the heat exchange unit 27 penetrates the water tank 40. Since part of or the entire heat exchange unit 27 is bent, the length of the heat exchange unit 27, bringing into contact with water, can be expanded. Accordingly, the freezing of water can be effectively prevented.

The heat exchange unit 27 can be bent in zigzags or wound like coil. In FIG. 2, an example in which the heat exchange unit 27 is bent in zigzags is illustrated. The shape of the heat exchange unit 27 is not limited to the example shown in FIG. 2, but can be modified in various ways.

As described above, the fuel cell system 100 according to the present exemplary embodiment prevents the freezing of the water tank 40 using heat generated therein. Accordingly, the fuel cell system 100 can be stably operated even at a sub-zero temperature. Further, since additional hot wires need not to be installed in the water tank 40, additional power for driving the hot wires is not required. Accordingly, generating efficiency of the fuel cell system 100 can be increased.

Figure 3:
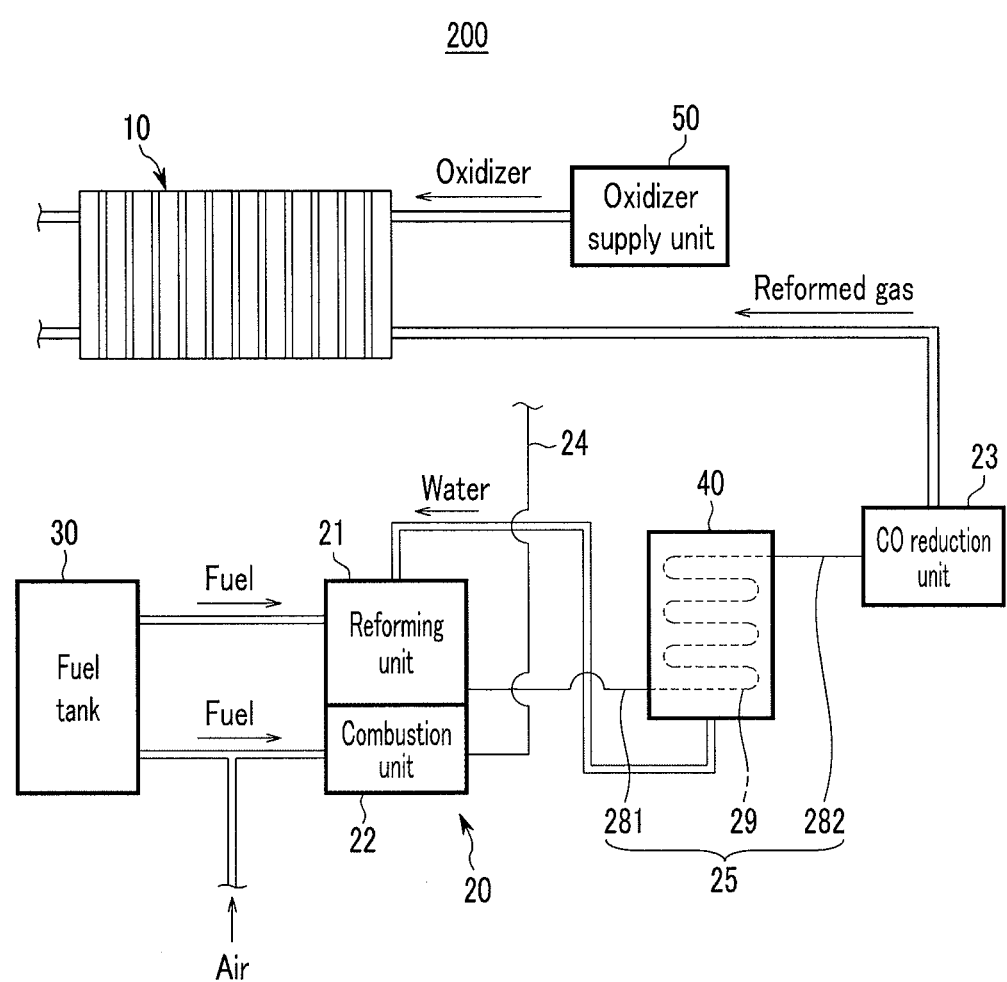
FIG. 3 is a schematic diagram of a fuel cell system according to a second exemplary embodiment of the present invention.

FIG. 3 is a schematic diagram of a fuel cell system according to a second exemplary embodiment of the present invention.

Referring to FIG. 3, the fuel cell system 200 according to the second exemplary embodiment is configured to raise an internal temperature of a water tank 40 using the heat of a reformed gas pipe 25 instead of the combustion gas pipe 24 according to the first exemplary embodiment. The fuel cell system 200 according to the second exemplary embodiment has the same construction as the fuel cell system of the first exemplary embodiment except the structures of the combustion gas pipe 24 and the reformed gas pipe 25. The same elements as the first exemplary embodiment are assigned the same reference numerals.

The reformed gas pipe 25, connecting a reforming unit 21 and a carbon monoxide reduction unit 23, has a temperature of approximately 80° C. to 90° C. The water tank 40 is disposed between the reforming unit 21 and the carbon monoxide reduction unit 23. The reformed gas pipe 25 is configured to pass through the inside of the water tank 40. That is, the reformed gas pipe 25 includes a first conveyer 281 disposed between the reforming unit 21 and the water tank 40, a heat exchange unit 29 disposed within the water tank 40, and a second conveyer 282 disposed between the water tank 40 and the carbon monoxide reduction unit 23.

Part of or the entire heat exchange unit 29 can be bent. The heat exchange unit 29 can be spaced apart from the interior wall of the water tank 40 with a predetermined distance therebetween except portions in which the heat exchange unit 29 penetrates the water tank 40. Since part of or the entire heat exchange unit 29 is bent, the length of the heat exchange unit 29 bringing into contact with water can be expanded, and so the freezing of water can be effectively prevented.

The heat exchange unit 29 can be bent in zigzags or wound like coil. In FIG. 3, an example in which the heat exchange unit 29 is bent in zigzags is illustrated. The shape of the heat exchange unit 29 is not limited to the example shown in FIG. 3 and can be modified in various ways.

Figure 4:
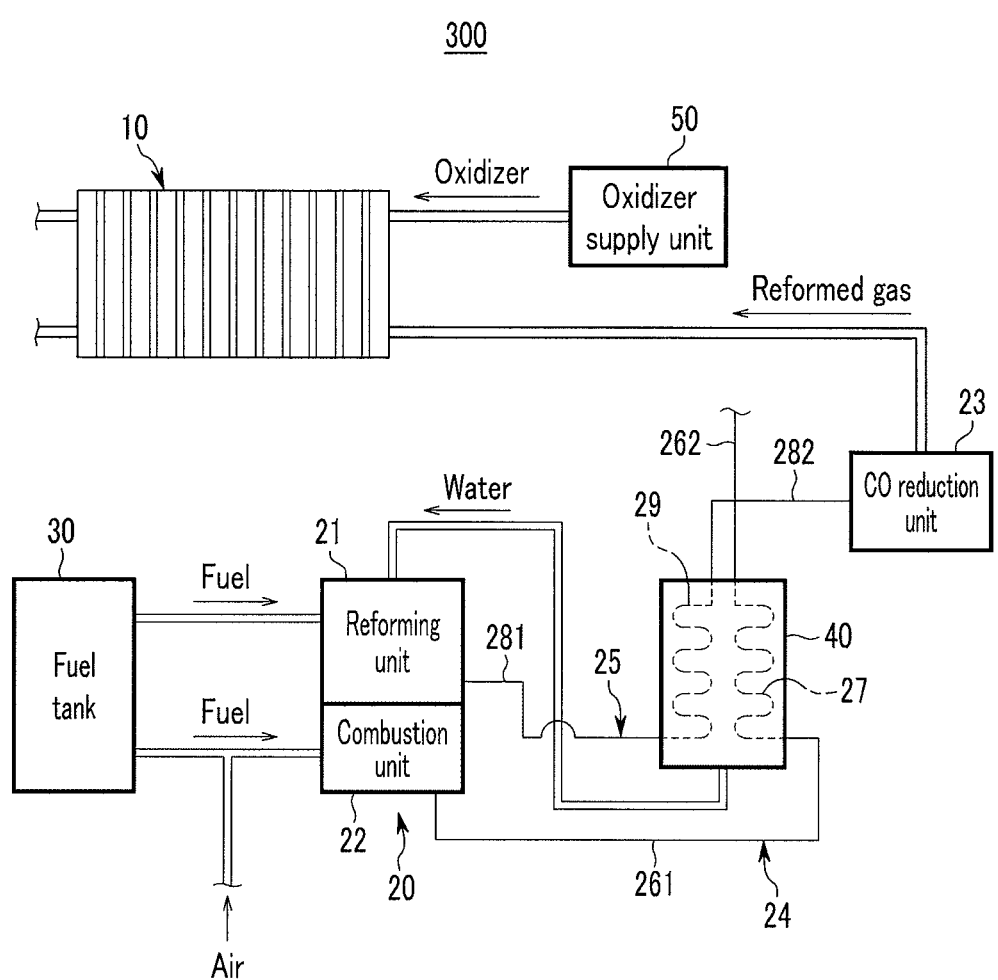
FIG. 4 is a schematic diagram of a fuel cell system according to a third exemplary embodiment of the present invention.

FIG. 4 is a schematic diagram of a fuel cell system according to a third exemplary embodiment of the present invention.

Referring to FIG. 4, the fuel cell system 300 according to the third exemplary embodiment is configured to raise an internal temperature of a water tank 40 using both the heat of a combustion gas pipe 24 and a reformed gas pipe 25. The fuel cell system 300 of the third exemplary embodiment has the same construction as the fuel cell system 100 of the first exemplary embodiment except the structures of the combustion gas pipe 24 and the reformed gas pipe 25. The same elements as the first exemplary embodiment are assigned the same reference numerals.

The water tank 40 is disposed between a reforming unit 21 and a carbon monoxide reduction unit 23. The combustion gas pipe 24 and the reformed gas pipe 25 are configured to pass through the inside of the water tank 40. That is, the combustion gas pipe 24 includes a first exhaust unit 261 disposed between a combustion unit 22 and the water tank 40, a heat exchange unit 27 disposed within the water tank 40, and a second exhaust unit 262 disposed outside of the water tank 40. The reformed gas pipe 25 includes a first conveyer 281 disposed between the reforming unit 21 and the water tank 40, a heat exchange unit 29 disposed within the water tank 40, and a second conveyer 282 disposed between the water tank 40 and the carbon monoxide reduction unit 23.

Each of the two heat exchange units 27 and 29 can be bent partly or generally. Each of the heat exchange units 27 and 29 can be spaced apart from the interior wall of the water tank 40 with a predetermined distance therebetween except portions in which it penetrates the water tank 40. Since each of the heat exchange units 27 and 29 is bent partly or generally, the length of each of the heat exchange units 27 and 29, brining into contact with water, can be expanded. Accordingly, the freezing of water can be effectively prevented. The two heat exchange units 27 and 29 can adjoin each other or can be spaced apart from each other. In FIG. 4, an example in which the two heat exchange units 27 and 29 are spaced apart from each other is illustrated.

Each of the heat exchange units 27 and 29 can be bent in zigzags or wound like coil. In FIG. 4, an example in which each of the heat exchange units 27 and 29 is bent in zigzags is illustrated. The shape of the heat exchange units 27 and 29 is not limited to the example shown in FIG. 4 and can be modified in various ways.

In the fuel cell system 300 of the third exemplary embodiment, a temperature of the water tank 40 is raised using both the heat of the combustion gas pipe 24 and the reformed gas pipe 25. Accordingly, the freezing of the water tank 40 can be more effectively prevented because heat use efficiency can be increased as compared with the first exemplary embodiment and the second exemplary embodiment. Each of the fuel cell systems 100, 200, and 300 according to the first to third exemplary embodiments does not require an additional device for preventing the freezing of the water tank 40 because it can prevent the freezing of the water tank 40 by changing only the structure of the combustion gas pipe 24 or the structure of the reformed gas pipe 25 or both.

Figure 5:
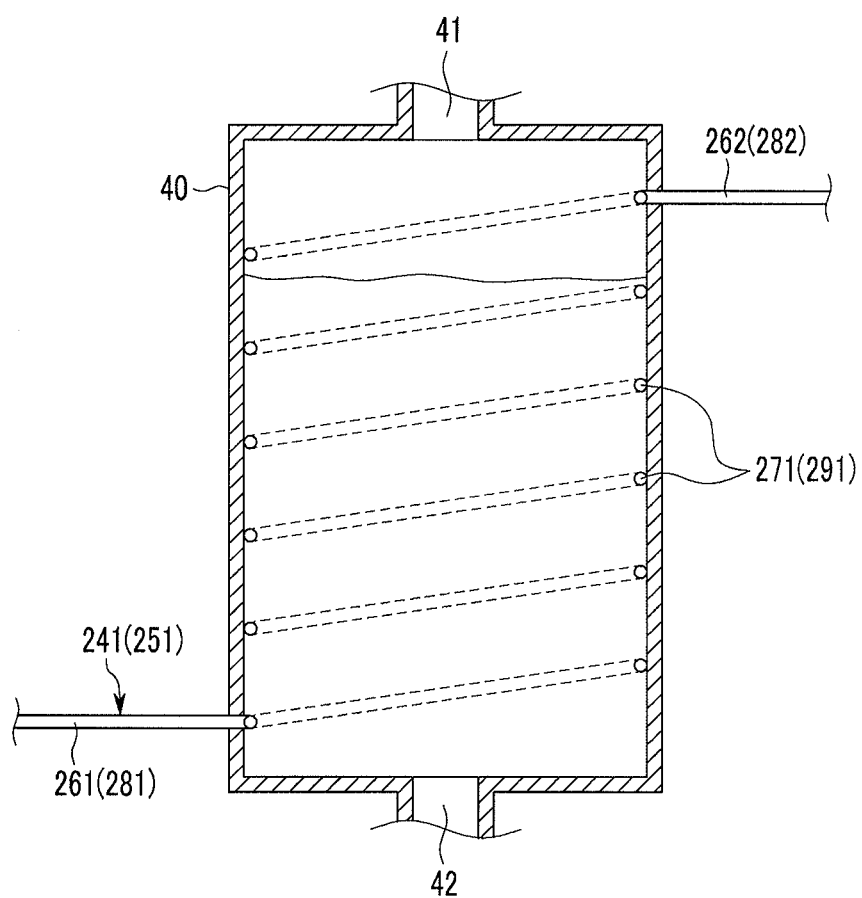
FIG. 5 is a cross-sectional view of the water tank of a fuel cell system according to a fourth exemplary embodiment of the present invention.

FIG. 5 is a cross-sectional view of the water tank of a fuel cell system according to a fourth exemplary embodiment of the present invention.

Referring to FIG. 5, the fuel cell system according to the fourth exemplary embodiment has the same construction as the fuel cell system according to the fuel cell system 100 or 200 according to the first or second exemplary embodiment except that the heat exchange unit 271 of a combustion gas pipe 241 or the heat exchange unit 291 of a reformed gas pipe 251 is brought into contact with the interior wall of a water tank 40. The same elements as the fuel cell system of the first or second exemplary embodiment are assigned the same reference numerals.

The heat exchange unit 271 or 291 can be disposed in a shape in which it is wound like coil along the interior wall of the water tank 40. Here, the number of times that the heat exchange unit 271 or 291 is wound is controlled. In this case, the length of the heat exchange unit 271 or 291 bringing into contact with the water tank 40 can be easily controlled. The heat exchange units 271 and 291 bring into contact with both the interior wall of the water tank 40 and water stored in the water tank 40. Accordingly, both the heat of a combust gas or a reformed gas flowing within the heat exchange units 271 and 291 is simultaneously transferred to the water tank 40 and the water stored in the water tank 40.

Figure 6:
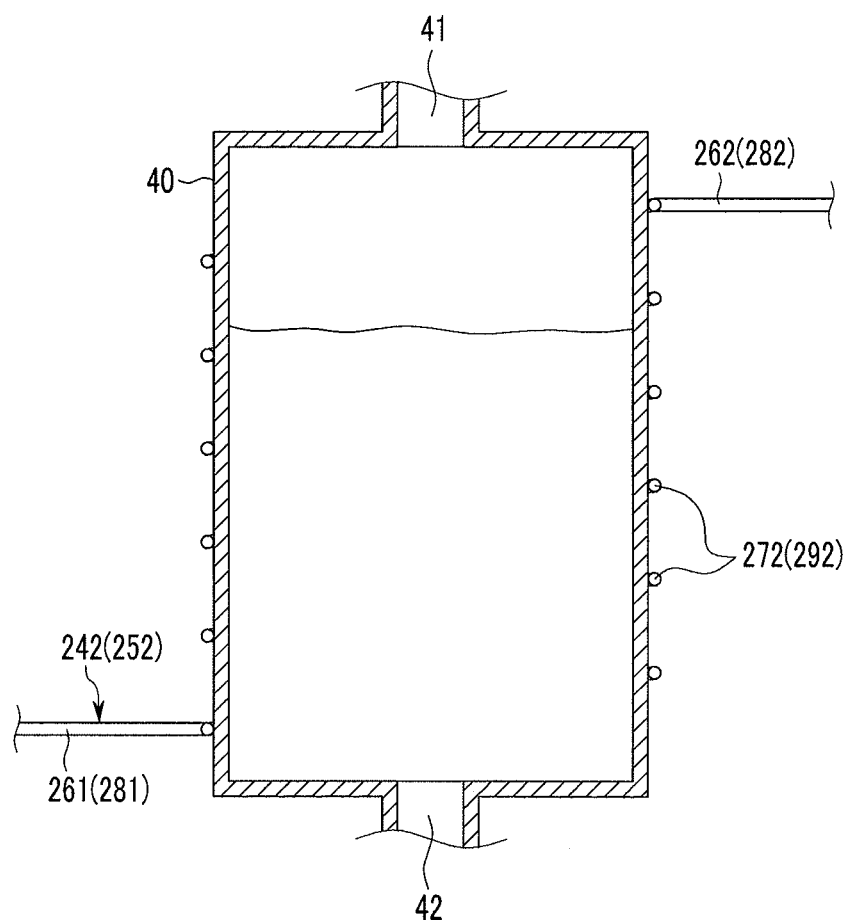
FIG. 6 is a cross-sectional view of the water tank of a fuel cell system according to a fifth exemplary embodiment of the present invention.

FIG. 6 is a cross-sectional view of the water tank of a fuel cell system according to a fifth exemplary embodiment of the present invention.

Referring to FIG. 6, the fuel cell system according to the fifth exemplary embodiment has the same construction as the fuel cell system 100 or 200 according to the first or second exemplary embodiment except that the heat exchange unit 272 of a combustion gas pipe 242 or the heat exchange unit 292 of a reformed gas pipe 252 is brought into contact with the exterior wall of a water tank 40. The same elements as the fuel cell system of the first or second exemplary embodiment are assigned the same reference numerals.

Each of the heat exchange units 272 and 292 can be disposed in a shape in which it is wound like coil along the exterior wall of the water tank 40. Here, the number of times that each of the heat exchange units 272 and 292 is wound is controlled. In this case, the length of the heat exchange unit, bringing into contact with the water tank 40, can be easily controlled. Since the heat exchange units 272 and 292 bring into contact with the exterior wall of the water tank 40, the heat of a combust gas or a reformed gas flowing within the heat exchange units 272 and 292 is transferred to the water tank 40. Accordingly, the heat raises a temperature of the water tank 40 and then raises a temperature of the water stored in the water tank 40.

Figure 7:
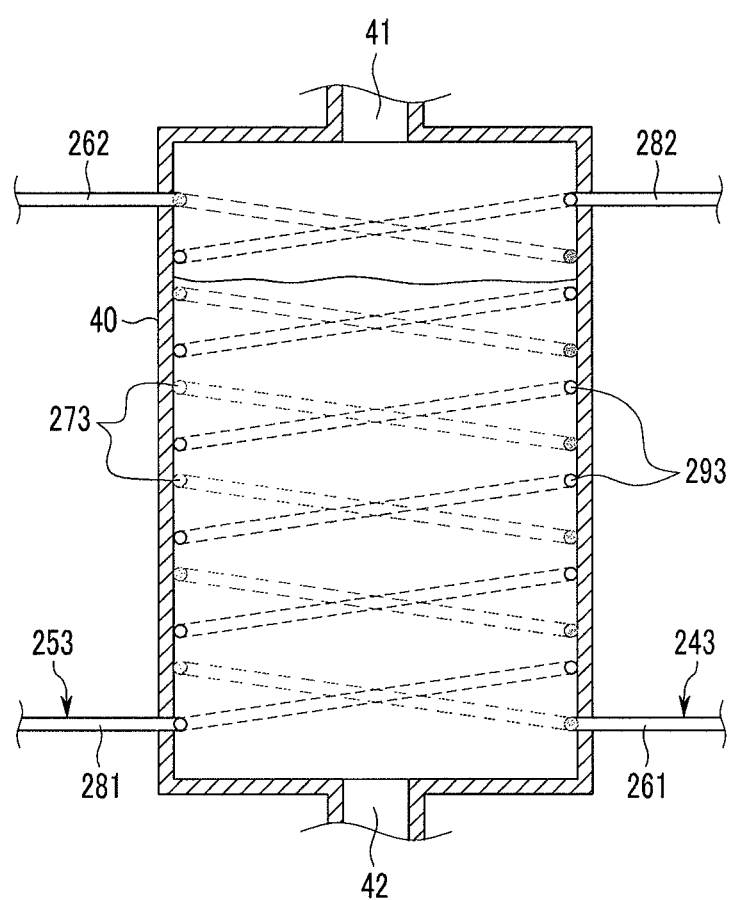
FIG. 7 is a cross-sectional view of the water tank of a fuel cell system according to a sixth exemplary embodiment of the present invention.

FIG. 7 is a cross-sectional view of the water tank of a fuel cell system according to a sixth exemplary embodiment of the present invention.

Referring to FIG. 7, the fuel cell system according to the sixth exemplary embodiment has the same construction as the fuel cell system according to the third exemplary embodiment except that the heat exchange unit 273 of a combustion gas pipe 243 and the heat exchange unit 293 of a reformed gas pipe 253 are brought into contact with the interior wall of a water tank 40. The same elements as the fuel cell system of the third exemplary embodiment are assigned the same reference numerals.

The two heat exchange units 273 and 293 can be wound like coil along the interior wall of the water tank 40 with a predetermined distance therebetween. The heat exchange units 273 and 293 bring into contact with both the interior wall of the water tank 40 and water stored in the water tank 40. Accordingly, heat of a combust gas and a reformed gas flowing within the heat exchange units 273 and 293 is simultaneously transferred to the water tank 40 and the water stored in the water tank 40.

Although the inside of the combustion gas pipe 243 is shaded in FIG. 7, for convenience of description, in order to distinguish the heat exchange units 273 and 293 from each other, the inside of the combustion gas pipe 243 is not clogged, and a passage for discharging the combust gas is formed within the combustion gas pipe 243.

Figure 8:
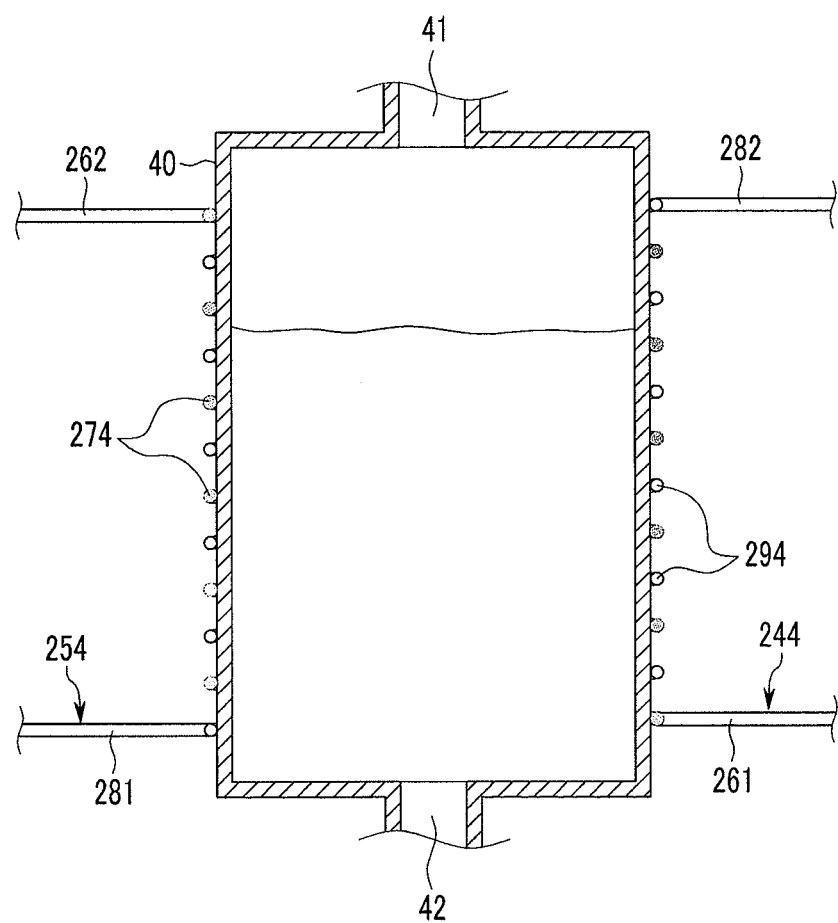
FIG. 8 is a cross-sectional view of the water tank of a fuel cell system according to a seventh exemplary embodiment of the present invention.

FIG. 8 is a cross-sectional view of the water tank of a fuel cell system according to a seventh exemplary embodiment of the present invention.

Referring to FIG. 8, the fuel cell system according to the seventh exemplary embodiment has the same construction as the fuel cell system of the third exemplary embodiment except that the heat exchange unit 274 of a combustion gas pipe 244 and the heat exchange unit 294 of a reformed gas pipe 254 are brought into contact with the exterior wall of a water tank 40. The same elements as the fuel cell system of the third exemplary embodiment are assigned the same reference numerals.

The two heat exchange units 274 and 294 can be wound like coil along the exterior wall of the water tank 40 with a predetermined distance therebetween. Since the heat exchange units 274 and 294 are brought into contact with the exterior wall of the water tank 40, heat of a combust gas and a reformed gas flowing within the heat exchange units 274 and 294 is transferred to the water tank 40. Accordingly, the heat raises a temperature of the water tank 40 and then raises a temperature of water stored in the water tank 40.

Although the inside of the combustion gas pipe 244 is shaded in FIG. 8, for convenience of description, in order to distinguish the heat exchange unit 274 and 294 from each other, the inside of the combustion gas pipe 244 is not clogged, and a passage for discharging the combust gas is formed within the combustion gas pipe 244.

Figure 9:
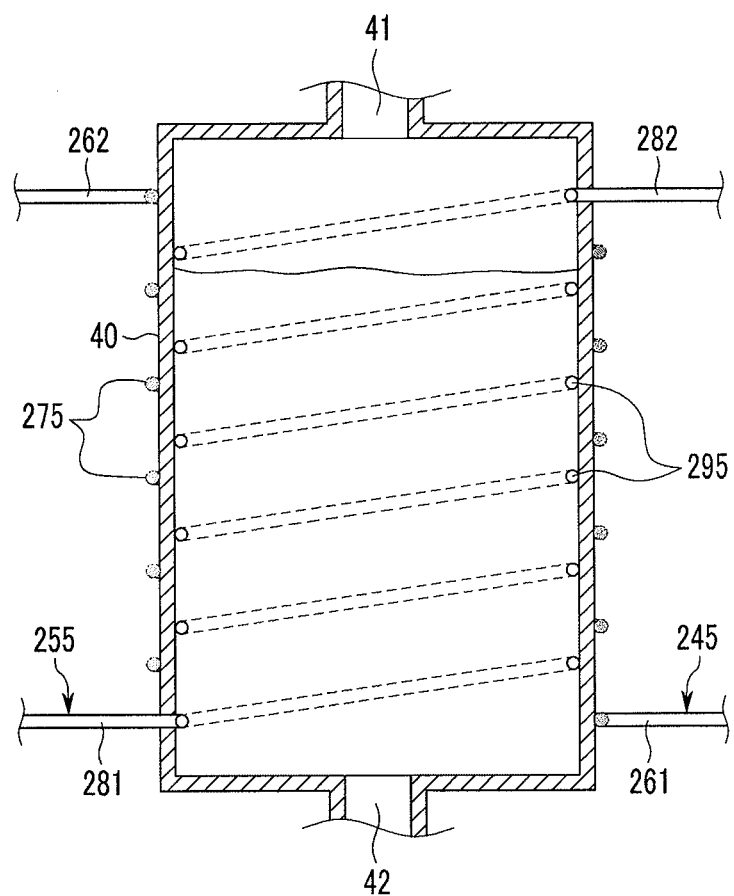
FIG. 9 is a cross-sectional view of the water tank of a fuel cell system according to an eighth exemplary embodiment of the present invention.

FIG. 9 is a cross-sectional view of the water tank of a fuel cell system according to an eighth exemplary embodiment of the present invention.

Referring to FIG. 9, the fuel cell system of the eighth exemplary embodiment has the same construction as the fuel cell system of the third exemplary embodiment except that one of the heat exchange unit 275 of a combustion gas pipe 245 and the heat exchange unit 295 of a reformed gas pipe 255 is brought into contact with the interior wall of a water tank 40 and the other thereof is brought into contact with the exterior wall of the water tank 40. The same elements as the fuel cell system of the third exemplary embodiment are assigned the same reference numerals.

In FIG. 9, an example in which the heat exchange unit 275 of the combustion gas pipe 245 is brought into contact with the exterior wall of the water tank 40 and the heat exchange unit 295 of the reformed gas pipe 255 is brought into contact with the interior wall of the water tank 40 is illustrated. The two heat exchange units 275 and 295 can be wound like coil along the exterior and interior walls of the water tank 40.

While this invention has been described in connection with what is presently considered to be practical some exemplary embodiments, it is to be understood that the invention is not limited to the disclosed embodiments, but, on the contrary, is intended to cover various modifications and equivalent arrangements included within the spirit and scope of the appended claims.

What is claimed is:
1. A fuel cell system, comprising:
a fuel cell stack;
an oxidizer supply unit in fluid communication with the fuel cell stack;
a reformer in fluid communication with the fuel cell stack through a reformed gas pipe, wherein the reformer comprises a reforming unit and a combustion unit;
a fuel tank in fluid communication with the reformer;
a water tank comprising an inlet and an outlet, wherein the outlet is in fluid communication with the reformer;

a first gas pipe from the reformer positioned to directly contact or pass through the water tank; and a second gas pipe from the reformer positioned to pass through the water tank, wherein a hot gas is transferred from the reformer to the first gas pipe and the second gas pipe, and the first gas pipe and the second gas pipe are alternatively wound with respect to each other around an inner and/or outer circumference of the water tank.

2. The fuel cell system of claim 1, wherein the first gas pipe comprises the reformed gas pipe, wherein the reformed gas pipe is in fluid communication with the reforming unit, and wherein the reformed gas pipe comprises:

a first conveyer disposed between the reforming unit and the water tank;

a heat exchange unit in fluid communication with the first conveyor; and a second conveyer in fluid communication with the heat exchange unit.

3. The fuel cell system of claim 2, wherein the heat exchange unit is disposed within the water tank.

4. The fuel cell system of claim 2, wherein the heat exchange unit is non-linear.

5. The fuel cell system of claim 2, wherein at least a portion of the heat exchange unit is wound in a coil.

6. The fuel cell system of claim 1, wherein the second gas pipe comprises a combustion gas pipe in fluid communication with the combustion unit, and wherein the combustion gas pipe comprises:

a first exhaust unit disposed between the combustion unit and the water tank;

a first heat exchange unit in fluid communication with the first exhaust unit; and a second exhaust unit in fluid communication with the first heat exchange unit.

7. The fuel cell system of claim 6, wherein the first heat exchange unit is disposed within the water tank.

8. The fuel cell system of claim 6, wherein the first heat exchange unit contacts an inner surface of the water tank.

9. The fuel cell system of claim 6, wherein the first heat exchange unit is non-linear.

10. The fuel cell system of claim 6, wherein the first heat exchange unit contacts an outer surface of the water tank.

11. The fuel cell system of claim 6, wherein the first heat exchange unit comprises a portion wound in a coil.

12. The fuel cell system of claim 6, wherein the reformed gas pipe comprises:

a first conveyer disposed between the reforming unit and the water tank;

a second heat exchange unit in fluid communication with the first conveyor; and a second conveyer in fluid communication with the second heat exchange unit.

13. The fuel cell system of claim 12, wherein the second heat exchange unit is disposed within the water tank.

14. The fuel cell system of claim 12, wherein the second heat exchange unit is non-linear.

15. The fuel cell system of claim 12, wherein at least a portion of the second heat exchange unit is wound in a coil.

16. The fuel cell system of claim 12, wherein the first heat exchange unit and the second heat exchange unit are disposed within the water tank.

17. The fuel cell system of claim 16, wherein the first heat exchange unit contacts an interior wall of the water tank and wherein the second heat exchange unit contacts an interior wall of the water tank.

18. The fuel cell system of claim 12, wherein the first heat exchange unit contacts an exterior wall of the water tank and wherein the second heat exchange unit contacts an exterior wall of the water tank.

19. The fuel cell system of claim 12, wherein the first heat exchange unit is disposed within the water tank and the second heat exchange unit contacts an exterior wall of the water tank.

20. The fuel cell system of claim 12, wherein the second heat exchange unit disposed within the water tank and the first heat exchange unit contacts an exterior wall of the water tank.

* * * * *